UNITED STATES PATENT OFFICE.

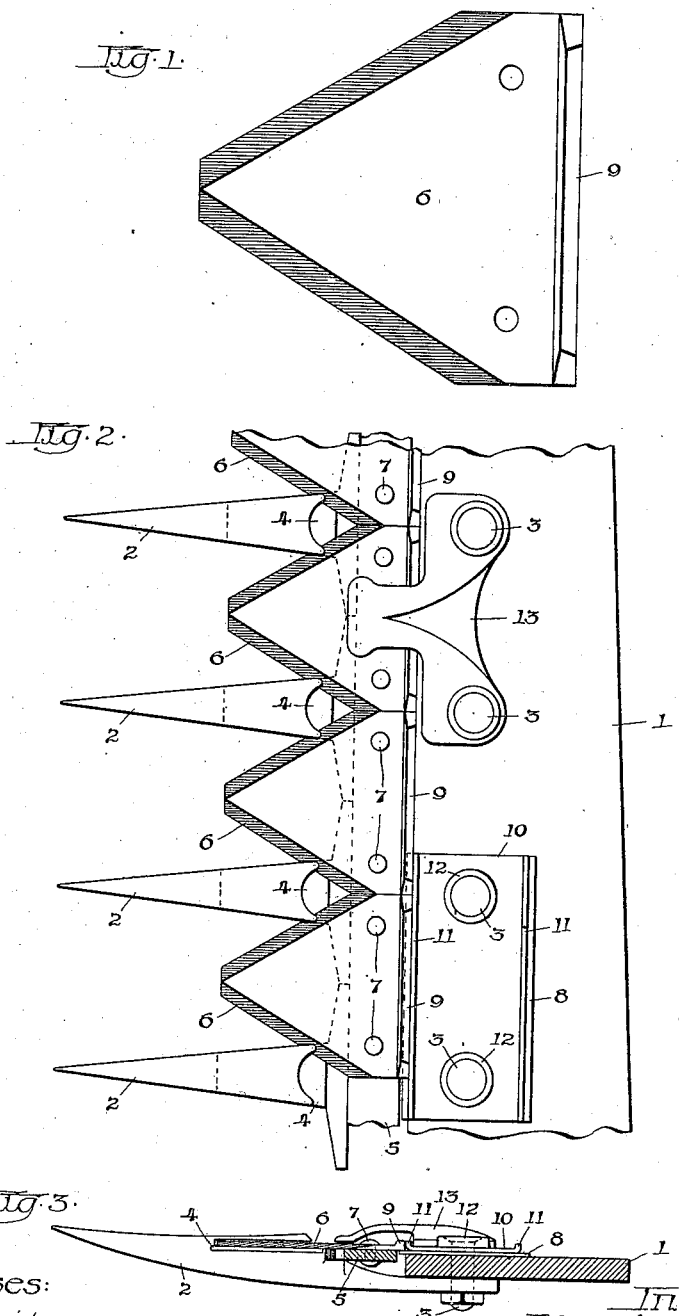

JOHN W. PRIDMORE, OF CHICAGO, ILLINOIS, ASSIGNOR TO INTERNATIONAL HARVESTER COMPANY, A CORPORATION OF NEW JERSEY.

CUTTING APPARATUS FOR MOWERS.

995,902. Specification of Letters Patent. Patented June 20, 1911.

Application filed December 6, 1909. Serial No. 531,504.

*To all whom it may concern:*

Be it known that I, JOHN W. PRIDMORE, a citizen of the United States, residing at Chicago, in the county of Cook and State of Illinois, have invented certain new and useful Improvements in Cutting Apparatus for Mowers, of which the following is a specification.

My invention relates in particular to the form of the individual sections that are secured to the knife back in a common way and associated with the guards in a manner comprising part of a cutting apparatus for mowers; the object of my invention being to provide a section that will operate in an efficient manner in performing its functions. I attain this object by means of the mechanism shown in the accompanying drawings, in which—

Figure 1 is a top plan view of a knife section embodying my invention; Fig. 2 is a top plan view of part of an assembled cutting apparatus of which my invention forms an integrant; Fig. 3 is an end elevation of Fig. 2.

The same reference numerals designate like parts throughout the several views.

1 represents a mower finger bar, 2 the guards secured thereto by means of bolts 3, 4 ledger plates secured to the guards, 5 the knife back having sections 6 secured thereto by means of rivets 7, the rear sides of the sections extending beyond the rear edge of the knife back and at spaced intervals resting upon the plates 8 secured to the finger bar. The rear part of each section is provided with an integral rib portion 9 raised above the body portion of the section and its cutting edge upon its upper side, that I prefer to form vertical at its rear side, having its front side inclined downward and forward, and having at opposite ends thereof portions at an angle in the direction of its length and toward the body portion of the section in a manner to form notches in the rib at the intersection of the knife sections for the purpose of preventing an accumulation of material between the clips and knife in the operation of the machine.

10 represents reversible wearing plates having upturned portions 11 adapted to contact with the vertical sides of the rib portions 9 of the sections, the wearing plates being secured to the finger bar by means of the same bolts that secure the guards and plates 8, and having boss portions 12 that are countersunk in a manner to receive the heads of the bolts.

13 represents the usual clip for holding the knife in operative position.

In operation the knife is given a reciprocatory motion in the usual manner, and the cutting edges of the sections coöperate with the cutting edges of the ledger plates in cutting the crop, and it is important that the sections be held in close contact with the ledger plates by other means than that of the clips, it not being practical to adjust those parts close enough for the purpose without causing undue friction between the clips and knife. In my invention the rib portion 9 is above body portion and the plane of the cutting edges of the sections and having its rear side contacting with the wearing plate, the pressure against the knife as the cutting apparatus moves against the uncut crop is resisted by the wearing plates in a manner to cause the sections to bear with greater pressure upon the ledger plates and increase the efficiency of their cutting operation.

What I claim as my invention, and desire to secure by Letters Patent, is:

1. A cutting apparatus for mowers including, in combination, a finger bar, guards secured to said finger bar, a knife back, knife sections secured to said knife back and provided with cutting edges adapted to coöperate with said guards, said sections having integral rib portions upon their rear sides raised above their body portions and the plane of their cutting edges, and means carried by said finger bar and adapted to coöperate with said rib portions in a manner to hold the cutting edges of said sections in close contact with said guards.

2. A cutting apparatus for mowers including, in combination, a knife section provided with cutting edges, a wearing plate, said section having an integral rib portion at its rear side raised above its body portion and the plane of its cutting edges and contacting with said wearing plate in a manner to resist a backward pressure against said section.

3. A cutting apparatus for mowers including, in combination, a finger bar, guards secured to said finger bar, a knife back, knife sections secured to said knife back and provided with cutting edges adapted to coöperate with said guards, said sections having integral rib portions upon their rear sides raised above their body portions and the plane of their cutting edges, wearing plates secured to said finger bar, said rib portions contacting with said wearing plates in a manner to hold the cutting edges of said sections in close contact with said guards.

4. A cutting apparatus for mowers including, in combination, a finger bar, guards secured to said finger bar, a knife back, knife sections secured to said knife back, having their rear edges extending in rear thereof, said knife sections being provided with cutting edges adapted to coöperate with said guards, plates secured to said finger bar and having the rear edges of said sections resting thereon, said sections having integral rib portions upon their rear edges raised above their body portions and the plane of their cutting edges, wearing plates secured to said finger bar, said rib portions contacting with said wearing plates in a manner to hold the cutting edges of said sections in close contact with said guards.

5. A cutting apparatus for mowers including, in combination, a finger bar, guards secured to said finger bar, a knife back, knife sections secured to said knife back and having their rear edges extending in rear thereof, said knife sections being provided with cutting edges adapted to coöperate with said guards, plates secured to said cutter bar and having the rear edges of said sections resting thereon, said sections having integral rib portions upon their rear edges raised above their body portions and the plane of their cutting edges, wearing plates secured to said finger bar above said first mentioned plates and having the same securing means, said rib portions contacting with said wearing plates in a manner to hold the cutting edges of said knife sections in close contact with said guards.

6. A cutting apparatus for mowers including a knife section having an integral rib portion at its rear edge raised above its body portion and the plane of the cutting edges thereof, said rib having at opposite ends thereof portions inclined downward in the direction of its length and toward the body portion of said section.

JOHN W. PRIDMORE.

Witnesses:
R. G. BROOKS,
B. C. MACLEOD.